United States Patent [19]

Krecisz et al.

[11] Patent Number: 4,496,930

[45] Date of Patent: Jan. 29, 1985

[54] IN-LINE FIRE DETECTOR OF A FIRE PROTECTION AND ALARM SYSTEM

[75] Inventors: Maria Krecisz; Witold Kotlewski; Krzysztof Bebenkowski, all of Warsaw, Poland

[73] Assignee: Politechnika Warszawska, Warsaw, Poland

[21] Appl. No.: 499,347

[22] Filed: May 31, 1983

[30] Foreign Application Priority Data

Aug. 13, 1982 [PL] Poland .................................. 237897

[51] Int. Cl.$^{3}$ ....................... H01B 7/00; H01B 17/34; G01M 3/16

[52] U.S. Cl. ...................................... 338/26; 338/214; 340/596

[58] Field of Search ....................... 338/26, 22 R, 214; 340/596; 337/11 R; 374/114; 324/52

[56] References Cited

U.S. PATENT DOCUMENTS

| | | | |
|---|---|---|---|
| 2,275,873 | 3/1942 | Turenne | 337/415 |
| 2,413,125 | 12/1946 | Walbridge | 338/26 |
| 2,477,348 | 7/1947 | Postal | 338/26 X |
| 2,566,335 | 9/1951 | Joerreu | 338/26 |
| 2,596,285 | 5/1952 | Peters | 338/26 X |
| 2,936,434 | 5/1960 | Postal | 338/26 |

FOREIGN PATENT DOCUMENTS

| | | | |
|---|---|---|---|
| 1544941 | 4/1979 | United Kingdom | 338/26 |

*Primary Examiner*—Roy N. Envall, Jr.
*Assistant Examiner*—C. N. Sears
*Attorney, Agent, or Firm*—Ladas & Parry

[57] ABSTRACT

A fire detector is provided with an electric insulator consisting of short segments of preferably a ceramic pipe disposed end-to-end within the space between an inside cylindrical electrode and cylindrical outside electrode. The inside electrode together with the insulator segments are covered with a thin salt-based layer and are disposed in the interior of the outside electrode so that between the insulator segments and the internal wall of the outside electrode an air space is formed along the length of the detector, whereby the insulator segments each provide a point-type contact between the internal wall of the outside electrode and the thin salt-based layer.

1 Claim, 2 Drawing Figures

IN-LINE FIRE DETECTOR OF A FIRE PROTECTION AND ALARM SYSTEM

FIELD OF THE INVENTION

This invention relates to an in-line fire detector of a fire protection and alarm system, employed especially in installations of aircraft power units as well as in storerooms and other rooms to be protected against fire.

DESCRIPTION OF THE PRIOR ART

Airplanes are provided with fire alarm systems warning the pilot of being in fire danger in order to prevent a disaster. The fire protection systems comprise generally one or more fire detectors installed directly on the aircraft engine and other parts of the vehicle, wherein a state of fire danger can develop.

An in-line fire detector known from the U.S. Pat. Nos. 3,406,389 and 3,540,041 consists of an inside electrode located co-axially within an outside electrode constituting simultaneously the protective casing of the detector. The interior of the outside electrode is filled with a salt or a mixture of salts, mostly with an eutectic salt with a filler, for instance with magnesium chloride, protecting against a short-circuiting between the inside electrode and the outside electrode, whereby both the inside electrode and the outside electrode are connected electrically and permanently across the eutectic salt.

Said eutectic salt contained between the inside electrode made of nickel and the outside electrode made of a high-temperature nickel-iron alloy undergoes structural modifications at a determined temperature so that at a temperature exceeding the eutectic point of the salt said salt reduces suddenly its own impedance.

An impedance meter connected with the inside and the outside electrode, after occurrence within the detector's area of a temperature exceeding the eutectic point of the salt, in course of measuring the drop of the detector's impedance value, signals the fire.

Disadvantages of detectors of that type consist in imperfections in the crystal structure of the eutectic salt, affecting the insulating properties of the salt even below the eutectic point. The salt crystal defects release current carriers as electrons, protons, cations, anions.

Crystal defects known as Frankel defects occur when a cation or an anion is removed from its interstitial position to a point wherefrom it cannot return to said primary position, leaving a vacancy in the crystal lattice, in the position left by the free ion.

Further, from the U.S. Pat. No. 3,546,689 is known an in-line fire detector, wherein the space between the outside electrode having the form of a casing tube and the rod-shaped inside electrode is filled with glass. The conductivity of such a detector depends of the conductivity of glass. If the detector is heated up to the critical temperature, then the resistance of the glass between said electrodes is altered.

In the non-heated state, the resistance of glass is very high, the glass constituting thus an electric insulator, whereas after heating up the glass reduces its resistance and constitutes an electric conductor.

A disadvantage of such a detector is its limited range of application since glass begins to conduct at high temperatures.

SUMMARY OF THE INVENTION

The detector according to the invention is provided with an electric insulator consisting preferably of short segments of a ceramic pipe, disposed generally end-to-end between a cylindrical inside electrode and a cylindrical outside one. Said inside electrode together with the electric insulator segments are coated with a thin salt based eutectic layer of a salt or a mixture and is placed inside the outside electrode so that between the electric insulator segments and the internal wall of the outside electrode an air space is formed along the length of the detector, and the insulator segments each provide a point-type contact between the internal wall of the outside electrode and the thin salt-based layer.

The detector according to the invention, due to employment of the electric insulator and formation of the air space, provides an extended length of the conducting path of the electric current, and due to the point-type contact of the insulator, between the thin salt-based layer, and the outside electrode, which until the moment of occurrence of fire does not form an electrical connection, the influence of structural defects of the salt is reduced substantially. Moreover, an increase of the conduction between the inside electrode and the outside electrode is achieved only after reaching a predetermined temperature corresponding with that of the fire, causing a melting of the salt or the salt mixture and a permanent connection with the electrode.

BRIEF DESCRIPTION OF THE DRAWINGS

The invention will be now described in particulars on an exemplary embodiment with reference to the accompanying drawing in which.

DESCRIPTION OF THE PREFERRED EMBODIMENT

Figure 1:
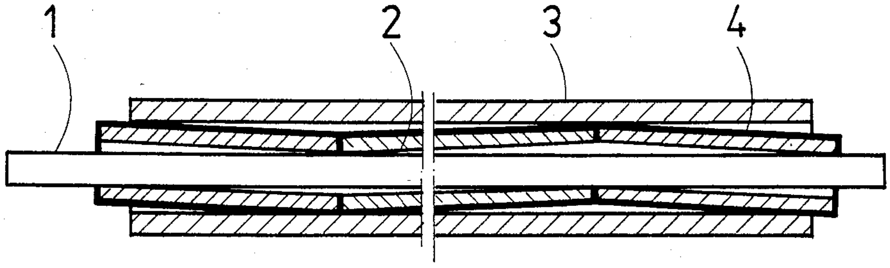
FIG. 1 is the longitudinal sectional view of the in-line fire detector.

As shown in FIG. 1, the fire detector according to the invention consists of an inside cylindrical electrode 1 placed in a generally tubular electric insulator 2 composed of short segments of cylindrical ceramic pipe arranged generally end-to-end but angularly offset and in a non-coaxial relation to the axis of the cylindrical electrode 1. The electrode 1 together with the insulator 2 is coated with a thin salt-based layer 4 of an active eutectic composition, and are disposed in the interior of an outside cylindrical electrode 3 so that between segmented insulator 2 and the internal wall of the outside electrode 3 an air space is formed along the length of the detector, and each segment of the insulator 2 provides a point-type contact with the internal wall of the outside electrode 3.

Figure 2:
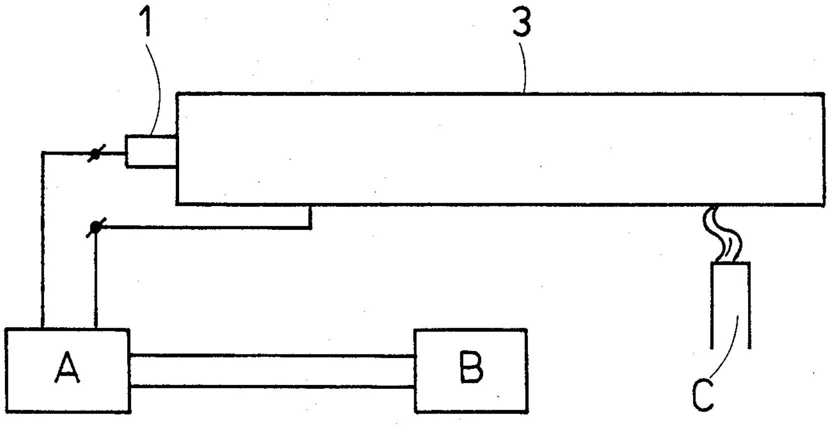
FIG. 2 is a diagram of a fire protection and alarm system.

The fire protection and alarm system shown in FIG. 2 comprises a fire detection block A connected with the electrodes 1 and 3 of the detector, the output of the block A is connected with a signalling block B. The occurrence of fire is shown by means of a symbol as the element C.

The detector shows in its not heated state a considerable resistance along the path: the inside electrode 1, the insulator 2, the active layer, the outside electrode 3 whereby the eutectic composition 4 remains in point-type contact with the interior of the outside electrode 3, but being not connected electrically, thus assuring low resistance of the connection.

The occurrence of a fire causes a local heating-up of the outside electrode 3 which causes the melting of the salt layer 4 within the heating zone, which suddenly alters its resistance. Then the conducting path involves: the inside electrode 1, the active layer 4, the internal surface of the outside electrode 3.

The alteration of the detector's resistance is detected by the block A from which the information on a fire condition is transmitted to the signalling block B which gives a signal of the occurrence of a fire.

What is claimed is:

1. In a fire detector for a fire protection and alarm system, consisting of an outside cylindrical electrode having the form of a protective tube, an inside cylindrical electrode having the form of a cylindrical rod disposed coaxially within said outside electrode, with an electric insulator therebetween, the improvements being characterized in that said insulator comprises short segments of a ceramic pipe disposed end-to-end in the space between the inside electrode and the outside electrode said inside electrode together with said electric insulator segments coated with a thin salt-based layer and disposed in the interior of said outside electrode so that between said electric insulator segments and the internal wall of the outside electrode along the length of the detector an air space is formed, and the electric insulator segments each providing a point-type contact between the internal wall of said outside electrode and the thin salt-based layer.

* * * * *